Nov. 24, 1953  R. D. CLEMSON  2,660,018
REEL MOWER
Filed Dec. 15, 1948  3 Sheets-Sheet 1
Fig. 1.
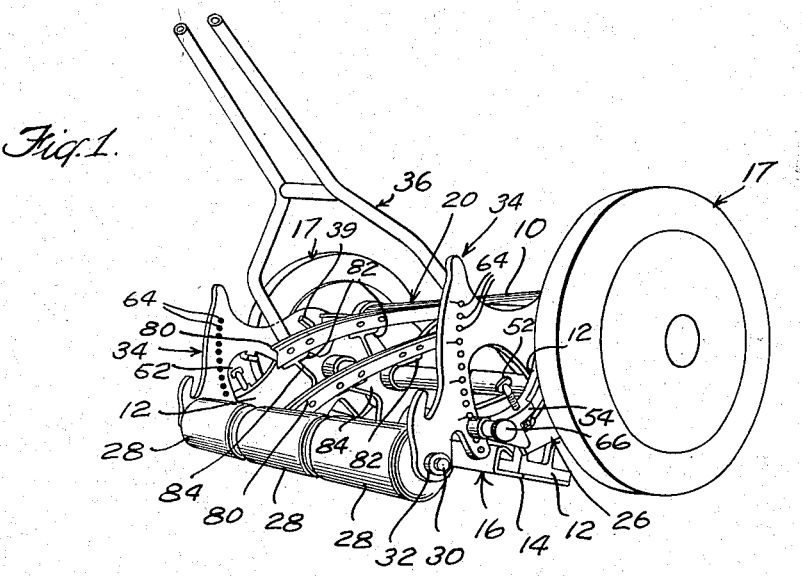
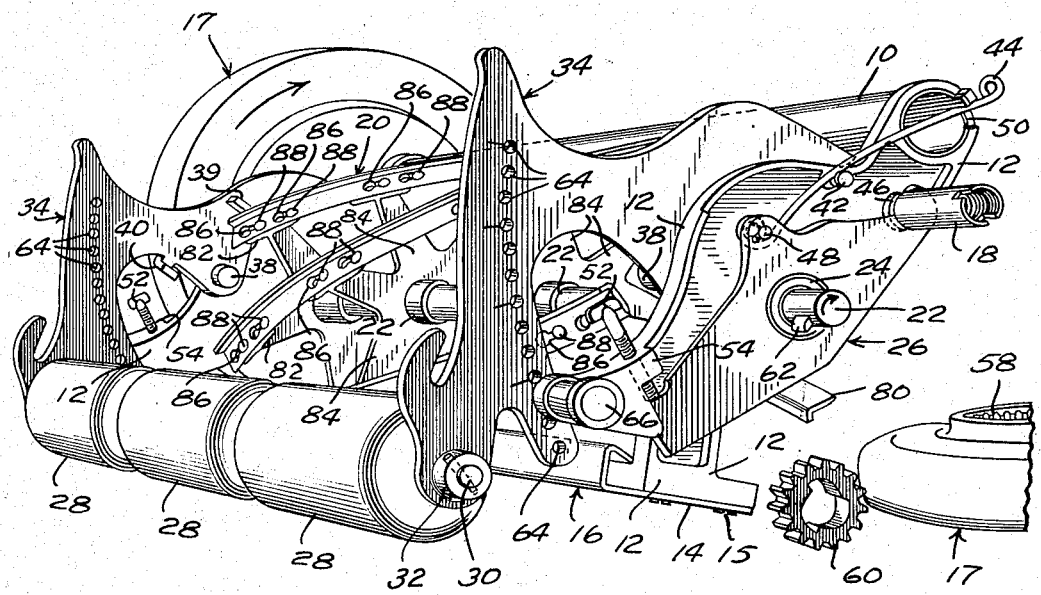
Fig. 2.
Inventor
RICHARD D. CLEMSON
By Curtis, Morris & Safford
Attorneys Nov. 24, 1953 — R. D. CLEMSON — 2,660,018
REEL MOWER
Filed Dec. 15, 1948 — 3 Sheets-Sheet 2

Inventor
RICHARD D. CLEMSON
By Curtis, Morris & Safford
Attorneys

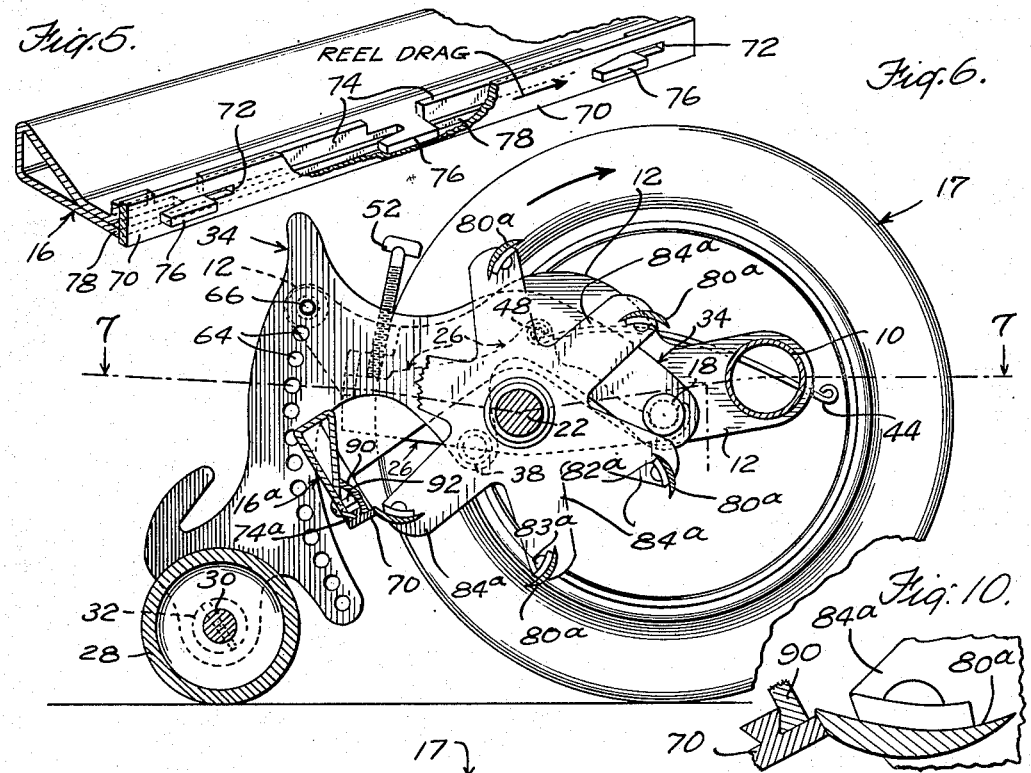
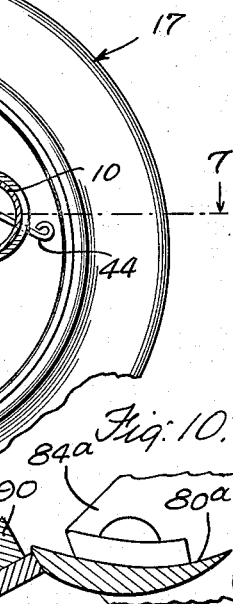
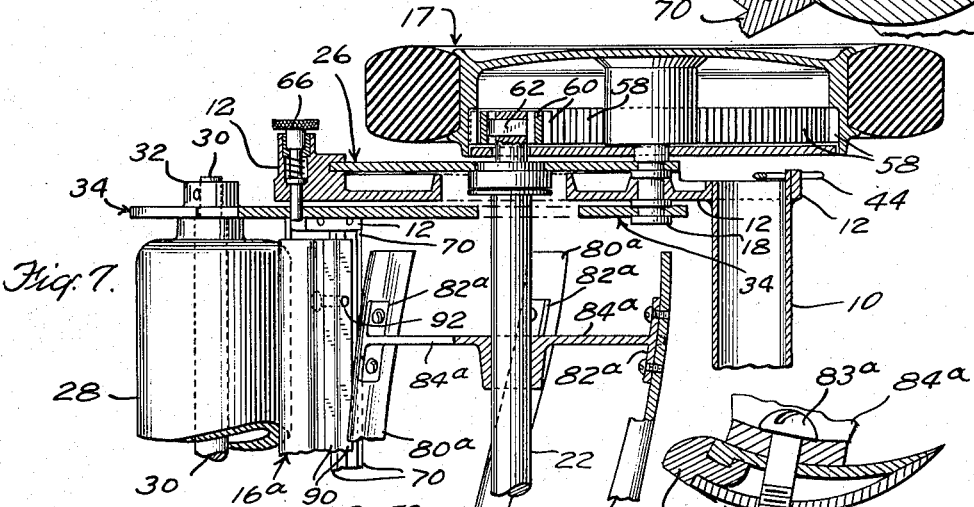
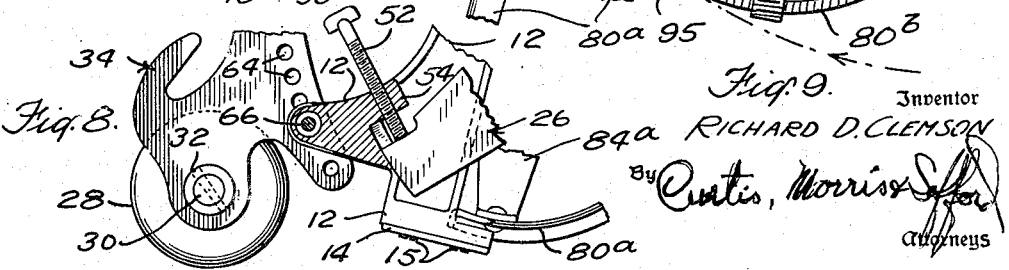

Patented Nov. 24, 1953

2,660,018

UNITED STATES PATENT OFFICE 2,660,018

REEL MOWER

Richard D. Clemson, Middletown, N. Y., assignor to Clemson Bros., Inc., Middletown, N. Y.

Application December 15, 1948, Serial No. 65,462

11 Claims. (Cl. 56—249)

1

This invention relates to shearing devices and more particularly to rotary shears of the type commonly used in lawn mowers, and more particularly to lawn mowing and other mowing machines.

It is one object of the present invention to provide a structure which is capable of cutting grass and weeds which would merely bend down ahead of an ordinary rotary reel mower. It is also an object to improve the efficiency of the cutting action and uniformity of the mowing operation.

Another object of the invention is to improve the effectiveness and to increase the useful life of a shearing or mowing machine.

Another object of the invention is to provide for maintenance of such a machine in a condition of maximum shearing efficiency with a minimum of expense and without the need for taking the machine out of service and sending it to a shop or to the factory for regrinding, etc.

Other objects and advantages of the invention will appear from the following description and the accompanying drawings.

In these drawings and the accompanying description I have set forth a preferred embodiment of my invention and various modifications thereof and have suggested certain alternatives. It is to be understood that these are not intended to be exhaustive or limiting of the invention, but on the contrary are given for purposes of illustration in order that others skilled in the art may fully understand the invention and the principles thereof and the manner of applying it in various forms, each as may be best suited to the conditions of a particular use.

In the drawings:

Figure 1 is a perspective view taken from the rear righthand side of the mower;

Figure 2 is a similar perspective view on a larger scale and with the handle and one of the wheels, guard plate and pinion removed to expose certain parts of the mechanism;

Figure 5 is a fragmentary isometric view on an enlarged scale of a portion of the bed knife shown in Figures 1-4 inclusive;

Figure 6 is a view similar to that of Figure 4 but showing a different bed knife and different flyknives and with the machine in a different position of adjustment for shearing at a higher level;

Figure 7 is a fragmentary view taken on line

2

Figure 4:
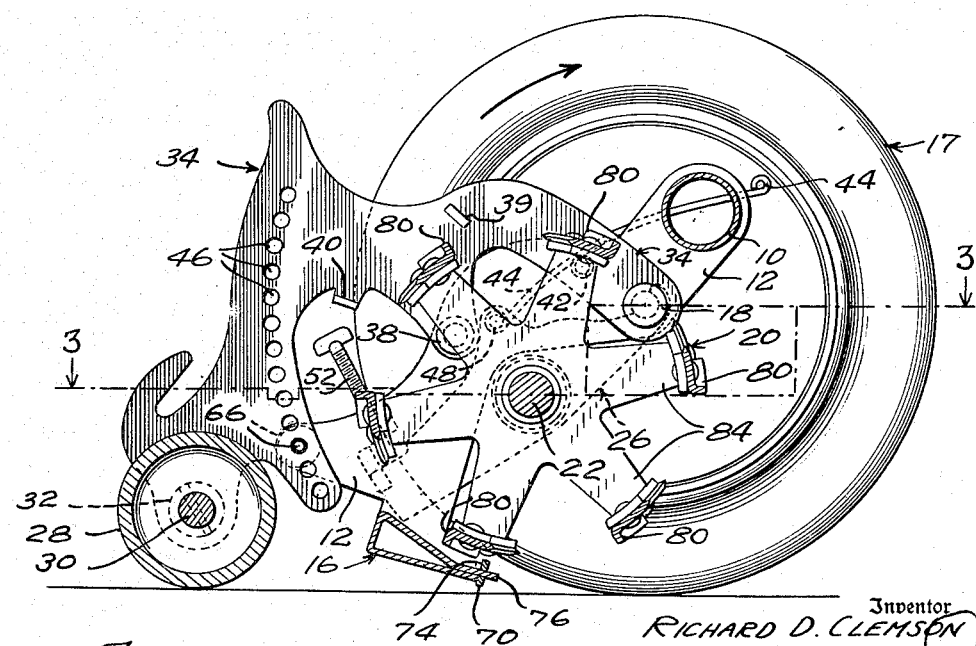
Figure 4 is a view in vertical section taken on line 4—4 of Figure 3.

7—7 of Figure 6, showing the parts in the adjusted relation of Figure 6;

Figure 8 is a fragmentary detailed view showing the same parts as the bottom lefthand portion of Figure 4 but in a plane passing along the surface of the outermost plate which is exposed in Figure 2; and, Figures 9 and 10 are fragmentary cross sectional views showing modified forms of fly-knife.

The machine shown in Figures 6 and 7 is modified from that shown in Figures 1-5 inclusive and 8 in that the shear knives are of different form and different fastenings are provided for securing the shear blade of the bed knife to its support.

Figure 3:
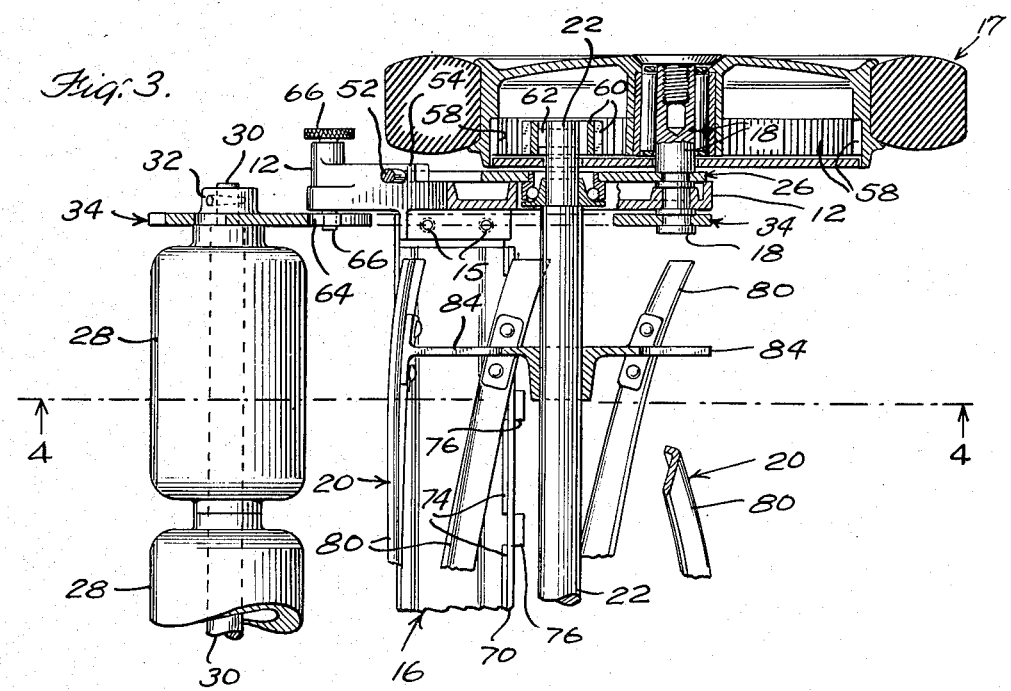
Figure 3 is a fragmentary view in longitudinal section taken on line 3—3 of Figure 4.

Referring first to Figures 1 and 2, the mower there shown consists broadly of a main frame composed of a tie tube 10, side frame members 12 rigidly and integrally secured thereto, ground wheels 17 mounted on the axles 18, a reel 20, having its shaft 22 mounted in cone bearings 24 and spring plates 26, ground roller assembly including the three rollers 28 mounted on an axle 30 secured, e. g. by taper pins driven through the shaft and the hubs 32 on the sector plate 34 pivoted on the inner end of the wheel axle shaft 18 (as best shown in Figure 3) and a handle 36, in this case made of tubular steel or aluminum having tines flattened at their ends and punched or drilled to fit onto the studs 38 and swing on these studs between the stops 39 and 40. The upper end of the handle is broken away in the drawing for convenience of showing. The handle in this case may be the same as is shown in my prior Patent No. 2,152,278, or may be the articulated handle, as more particularly described and claimed in the copending application Serial No. 49,362, filed September 15, 1948.

The ends of the side frames opposite to the tie tube are accurately formed to provide respectively aligned flat faces against which are mounted and rigidly bolted the flat ends 14 of the bed knife 16. The accurately spaced relationships in this frame are secured by casting the two side frames at the same time in a precision casting die and by assembling the bed knife with the frame in a jig which holds the side frames accurately positioned while holes are drilled into the frame members 12 and through the bed knife ends 14, into which dowels are inserted. While the frames and bed knife are still held in the jig, additional holes are drilled and tapped and countersunk for the bolts 15, which hold the bed knife against the frame.

Studs 48 and 42 both serving to hold a spring 44, as hereinafter to be described, are integrally embodied in each side frame by mounting in the casting die and casting the metal around them.

Reference has already been made to spring plate 26. This is formed at its forward upper ends with a recessed edge—preferably an arcuate or V-shaped recess which fits into a groove 46 near the base of the wheel axle 18. (See Figures 2 and 4.) Near the middle of the upper edge of the spring plate 26 is a stud 48 on which is mounted the spring 44 already referred to, and this spring passes first through a groove in the stud 42 and then into an undercut slot 50 in the end of the tie tube 10 by which it is locked in place under stress. This serves to preload the cone bearings 24 and thus to assure automatic take-up of any wear which may occur. The opposite end of the spring plate 26 is engaged by the adjusting screw 52 mounted in the boss 54 integrally cast on the side member 12. (See Figures 2 and 3.) The springs 44 tend also to hold the spring plates 26 up against the adjusting screw 52 and advantageously are designed to carry the weight of the reel, so that only the pressure imposed by the screws 52 is exerted by the reel against the bed knife when it is freely rotated.

The reel is driven from the traction wheels 17 by the internal ring gears 58 of the wheels driving through the pinions 60 and the shuttle pins 62 in the ends of the shaft 22 operating as over-running clutches.

The sector plates 34 are each provided with a series of holes 64 into any of which the spring pressed latch pin 66 may engage, as best shown in Figure 7.

This structure as thus far described embodies the inventions heretofore known and many of which are described and claimed in my prior patents and co-pending applications, and particularly in my application Serial No. 49,362, filed September 15, 1948, now Patent No. 2,624,168.

In accordance with the present invention the bed knife 16 differs from those heretofore in use by its provision of a hardened steel blade or edge strip 70, best seen in Figures 3, 4, and 5. The main supporting structure of this bed knife is similar to that previously described in my prior patent, and is made by folding a sheet of heavy steel so as to form a hollow back with a double thickness front portion formed by parallel edges advantageously grazed, welded or riveted together. In my prior mowers one of these edges has been utilized as the cutting edge of the bed knife. According to the present invention, however, there is mounted on the edge of this supporting structure a separate harder strip, advantageously of a special tool material, e. g., heat treated alloy steel or high carbon steel.

As shown in Figures 3-5 inclusive, this strip 70 is a symmetrical narrow strip with longiudinal slots 72 at regularly spaced intervals along its length and centered with respect to its width.

For most of its length the upper fold of bed knife 16 has its edge bent upward as shown at 74; but at intervals along its length, portions 76 are left standing straight outward and are undercut from one side thereof so as to form hooks 76. These undercuts in hooks 76 extend from the side opposite to that toward which the bed knife is pushed by the drag of the reel as it rotates in cutting, and thus when the hard edge strip 70 is put in place with the hooks 76 fitted into the slots 72 and then moved longitudinally to lock the strip in the undercuts of hooks 76, the operating drag of the reel will serve to hold the strips in the locked relation.

In this position the strip 70 is held against the accurately formed lower edge 78 of the bed knife 16 and the upturned lip, or upper edge portion 74. The undercuts in hooks 76 are sloped or tapered to a spacing from the edges 74, 78 very slightly less than the thickness of the strip 70 so that the latter is jammed against the edges 74, 78. The strip 70 is thus very securely held and yet it can be removed and replaced with a new strip or inverted to present a fresh edge at any time when it becomes unduly worn or dulled.

The fly knives 80 of the reel 20 are, according to the present invention, arranged so as to present a relatively narrow leading edge in the direction of movement, and an aerodynamic form such as to deflect the air through which is passes toward the center by a turbine action, instead of driving it outward by centrifugal action as has been the case with all reels used heretofore, so far as I am aware. I have found that one of the principal difficulties in cutting tall grass, particularly in the rapid-growing season, is due to the fanning by reason of this centrifugal action of the reel, which tends to blow the grass down away from the reel so that much of it is not engaged between the fly knives and the bed knife. This difficulty is exaggerated when the mower is adjusted to a high level cut, for example as shown in Fig. 6 wherein the bed knife rises substantially above and behind the bottom of the reel. By the present invention, however, this is largely avoided by reason of the turbine action of the blades and their aerodynamic form such that the air is not driven tangentially ahead of the blade but is deflected inward so as to produce a substantially neutral effect or even a positive suction by which the grass is drawn in between the blades of the reel and thus presented to the shear.

An additional advantage of the blades of the form shown is their rigidity against shock and impact. Because of the angular section they are extremely rigid for the actual weight, and because of their relatively great width in a tangential or chordal direction the strength against impact is extremely high.

In Figures 6 and 7 I have shown other fly knife and bed knife structures embodying the present invention. In the case there illustrated, instead of the angular form of fly knives, as just described, with the trailing edges sharpened to improve the aerodynamic functioning, I have in this case used fly knives 80a having cross-sectional form similar to conventional turbine blading and having a substantially airfoil cross section. This is arranged so that its outer face near the leading edge is cylindrical corresponding to the cylinder of revolution of the edges about the axis of the reel, while the trailing edge is turned inward and the remaining surfaces curved, convex on the outside and concave on the inner side so as to produce an efficient turbine action driving the air inwardly and thus sucking grass into position over the shearing edges of the fly knives.

Whereas in Figure 1 the fly knives are shown as riveted onto the lug 82 on the spider 84 (see Figure 3); in Figure 2 the fly knives are shown formed with keyhole slots 86 in which the headed fastening rivets 88 are engaged, so that the fly knives can be readily inserted, removed and replaced without the use of any tool other than a hammer or flat surface against which the end of the reel may be struck. In the case illustrated in Figures 6, 7, 8 and 10, the spiders 84a are cast onto the axle with slots from their periphery into which the fly knives 80a are inserted, and with lugs 82a onto which the fly knives are held by screws inserted from the back so that centrifugal force tends to hold them; or, if desired, by riveting etc.

The outer peripheral edge of the spiders 84a are tapered or chisel-edged, so that they can come as lose as possible to the leading edge of the fly knives and therefore afford the maximum support without interfering with the shearing action.

The form of bed knife shown in Figures 6 and 7, like that shown in the earlier figures and the bed knives used in my prior patents, consists of folded sheet metal in this case having the lower edge folded up over the upper edge to form a lip 74a similar to that formed on the upper edge in the embodiment previously described. The hard edge strip 70 in this case is formed with a dove-tail rim on its back side which may be cheaply accomplished either by wire drawing, rolling or extrusion methods. A clamping strip 90 is formed so that its forward edge engages over the dove tail on the strip 70 and its rear edge bears against the sloping face of the bed knife 16a. Screws 92 are threaded into holes in the clamping strip 90 to clamp the hard edge strip 70 in position.

Since the end of the strip 70 abuts the frame 12, it is held against any tendency to move longitudinally under the drag of the spiral fly knives as the reel rotates, and it is thus held securely.

When the edge of the strip is worn or dulled, screws 92 may be loosened, strip 70 removed and inverted so as to bring the lower edge into cutting position at the top, and thus a sharp efficient cutting shear is renewed. When the second edge has become unduly worn or dulled, a new strip may be purchased at relatively low cost and inserted by any user of the machine with average mechanical understanding. Because the hard edge strip is held against a rigid and accurately formed edge 74 or 74a and 90, it can be made of such narrow cross section as to be substantially flexible and yet form a precision shearing edge. This permits the use of the most expensive and highest quality materials for this edge strip without excessive increase in cost of the mower.

Figure 9 shows an alternative form of fly knife wherein a narrow hard edge strip is used in a manner similar to that described for the bed knife. Here the body 80b of the fly-knife is split and its ends formed to interfit with and securely engage the hard edge strip 95. By prying open the split fly-knife, strip 95 can be released and replaced with another, sharp and accurately ground. When the fly-knife is mounted as shown in Figure 6, the fly-knife body 80b is locked by the spiders 84a against spreading and thus the hard edge strip is securely locked in the fly-knife. Only when the screws 83a are removed and the fly-knives taken out of the spiders 84a can the hard strip be removed and replaced.

It is to be understood that the invention is not limited to the conventional cylindrical spiral blade reel but, in its broader aspect is applicable to all shear type mowers, especially to those wherein a succession of shear blades move along a closed path into repeated co-action with the same cooperating shear blade.

I claim:
1. In a lawn mower having at least one pair of cutting blades with their edges angularly related, a support member for at least one of said blades, a hard shear strip member positioned and supported along at least one of said blades and having a broad angle shearing edge, said strip being secured to said support member by fixed headed fastenings and keyhole slots, said slots being substantially longitudinal of the strip with their narrower ends extending toward the leading end of said strip, whereby the reaction to shearing exerts a longitudinal thrust driving said narrower end of the slots on the headed fastenings therein during shearing.

2. An apparatus as defined in claim 1 in which each of the cooperating shear blades is provided with a support member and one of said hard shear strips extending substantially its full length.

3. In a lawn mower having a fixed cooperating shear blade and a rotary reel carrying a plurality of shear blades; support members for said blades, a hard shear strip member positioned and conformed along at least one of said blades and having a dove tail rib engaging the support member at one side and fastening means on the support member engaging the other side, said strip having thereon a true shear edge formed by a broad angle between a face lying on the cylinder of revolution of said reel and an adjacent face extending chordally inward therefrom.

4. A rotary shear lawn mower comprising a pair of bladed cutting members having the shearing edges of their blades crossing at an acute angle to each other, and bearings pivotally connecting said blades to guide the shearing movement and hold them in shearing relationship, which device is characterized by each shear blade having a support member and a hard shear strip member removably secured thereon provided with a broad angle shearing edge, one of said shear blades being a fixed bed knife and the cooperating blade being a spiral fly-knife having its shear edge in the path of its rotation and its cross-section approximating that of a turbine blade adapted to impel air inwardly, whereby when said fly knife is rotated, centrifugal fanning away from the line of cut is avoided.

5. A rotary shear lawn mower which comprises a reel having a plurality of turbine-like blades each blade of which has a shearing edge and a body portion extending inward and backward from its shearing edge with said reel blade shearing edges lying along the outermost extremity of the reel.

6. A rotary shear lawn mower including a fixed bed knife and a rotary reel comprising a plurality of circumferentially spaced full length fly-knives L-shaped in cross-section and each having its shear edge on the relatively short side of the L, said short side upstanding behind the radius from the shear edge to the axis of the reel and its relatively long side disposed close within the cylinder of revolution of said cutting edge and trailing from the direction of rotation.

7. A rotary shear lawn mower as defined in claim 6, wherein the L section of said fly-knife has an obtuse angle and said short side is of a height approximately twice the thickness of said strip.

8. A rotary shear lawn mower including a rotary reel having a plurality of fly-knives, each having a blunt shearing edge portion and a base portion trailing substantially backward, with respect to the direction of travel of said fly-knives and inward, with respect to radial distance from the reel axis, and having a width, measured circumferentially, which is several times the said radial height, whereby upon rotation of said device, fanning away of the material to be cut is avoided.

9. A rotary shear lawn mower as defined in claim 8, wherein the fly-knives are concavo-convex in cross section.

10. A rotary shear lawn mower which comprises a reel having a plurality of blades detachably mounted thereon, each of said blades comprising a strip of concavo-convex cross section, means for mounting said strips on said reel and for securing said strips thereon, with their concave side facing the direction of rotation, with one edge of each strip outermost and foremost in the direction of rotation to form the shearing edge.

11. A rotary shear lawn mower which comprises a reel having a plurality of blades detachably mounted thereon, each of said blades comprising a strip of concavo-convex cross section, means for mounting said strips on said reel and for securing said strips thereon with their concave side facing the direction of rotation, with a blunt edge of each strip outermost and foremost in the direction of rotation to form the shearing edge and a sharper edge trailing at a shorter radius.

RICHARD D. CLEMSON.

References Cited in the file of this patent

UNITED STATES PATENTS

| Number | Name | Date |
| --- | --- | --- |
| 364,792 | Beecher | June 14, 1887 |
| 980,072 | Cramer | Dec. 27, 1910 |
| 1,139,796 | Parker | May 18, 1915 |
| 1,348,471 | Aspenwall | Aug. 3, 1920 |
| 1,705,810 | Driest, Jr. | Mar. 19, 1929 |
| 1,741,376 | Ritter | Dec. 31, 1929 |
| 1,882,195 | Sharp | Oct. 11, 1932 |
| 1,903,183 | Jessup | Mar. 28, 1933 |
| 2,045,386 | Gottschalk | June 23, 1936 |
| 2,260,801 | Clemson | Oct. 28, 1941 |
| 2,266,308 | Clemson | Dec. 16, 1941 |
| 2,365,338 | Godwin | Dec. 19, 1944 |
| 2,401,611 | Carlson | June 4, 1946 |